(12) United States Patent
Filliman et al.

(10) Patent No.: US 7,031,206 B2
(45) Date of Patent: Apr. 18, 2006

(54) DIGITAL LINE DELAY USING A SINGLE PORT MEMORY

(75) Inventors: Paul Dean Filliman, Indianapolis, IN (US); Michael Dwayne Knox, Fishers, IN (US); David Leon Simpson, Fishers, IN (US)

(73) Assignee: Thomson Licensing, Boulogne (FR)

( * ) Notice: Subject to any disclaimer, the term of this patent is extended or adjusted under 35 U.S.C. 154(b) by 0 days.

(21) Appl. No.: 10/490,015

(22) PCT Filed: Sep. 19, 2002

(86) PCT No.: PCT/US02/29808

§ 371 (c)(1),
(2), (4) Date: Mar. 18, 2004

(87) PCT Pub. No.: WO03/025900

PCT Pub. Date: Mar. 27, 2003

(65) Prior Publication Data

US 2005/0093871 A1 May 5, 2005

Related U.S. Application Data

(60) Provisional application No. 60/323,238, filed on Sep. 19, 2001.

(51) Int. Cl.
*G11C 7/00* (2006.01)
*G06F 13/00* (2006.01)

(52) U.S. Cl. ...................... 365/194; 345/537
(58) Field of Classification Search ............... 345/530, 345/536–537, 543; 711/5, 100, 104–105; 365/189.12, 194, 239, 240
See application file for complete search history.

(56) References Cited

U.S. PATENT DOCUMENTS

| 5,537,563 | A | * | 7/1996 | Guttag et al. ............... 711/100 |
| 5,608,425 | A | | 3/1997 | Movshovich ............... 345/141 |
| 5,774,178 | A | | 6/1998 | Chern et al. ............... 348/206 |
| 6,118,818 | A | * | 9/2000 | Min et al. ............... 375/240.12 |
| 2002/0031039 | A1 | * | 3/2002 | Suzuki ............... 365/230.06 |

* cited by examiner

*Primary Examiner*—Kee M. Tung
(74) *Attorney, Agent, or Firm*—Joseph S. Tripoli; Ronald H. Kurdyla; Vincent E. Duffy

(57) ABSTRACT

An apparatus for delaying video line data between a sending device and a receiving device is provided. The apparatus includes a single port random access memory ("RAM") and a processing arrangement including a first storage device coupled to the RAM and a second storage device coupled to the RAM.

15 Claims, 4 Drawing Sheets

US 7,031,206 B2

DIGITAL LINE DELAY USING A SINGLE PORT MEMORY

PRIORITY CLAIM

This application claims the benefit, under 35 U.S.C. § 365 of International Application PCT/US02/29808, filed Sep. 19, 2002, which was published in accordance with PCT Article 21(2) on Mar. 27, 2003 in English and which claims the benefit of U.S. Provisional Patent Application No. 60/323, 238, filed Sep. 19, 2001.

FIELD OF THE INVENTION

The present invention relates to the field of digital signal processing.

BACKGROUND OF THE INVENTION

A conventional video signal consists of a series of frames. Each frame contains a series of lines, and each line contains a plurality of pixels. Video line delays (or "video delay lines") are needed to perform vertical format conversion and picture signal improvement. Other digital signal processing applications, such as audio filtering, and other computer related applications also require digital data to be delayed for a deterministic number of clock cycles. A typical line delay is constructed using a first-in-first-out queue ("FIFO"), with the line data fed into the input of the FIFO and clocked through to the FIFO output at a rate dependent on the amount of delay required and the FIFO size.

Typically, a Random Access Memory ("RAM") is used in the FIFO when the amount of data is large enough to make the RAM implementation more practical than the alternatives (flip-flops or latches). For systems that have data written to and read from the RAM at times that are independent from each other, a dual-port RAM is typically used. A dual port RAM has independent read and write ports. Among other things, the dual ports allow data to be written to one RAM address and read from another simultaneously, which facilitates the delay design. However, a drawback of dual port RAMs is their silicon area. A dual port RAM can be 100% larger than a comparable single port RAM. Additionally, dual port RAMs are undesirably expensive.

The present invention is directed to overcoming this problem.

SUMMARY OF THE INVENTION

An apparatus for delaying video line data between a sending device and a receiving device includes a single port random access memory ("RAM") and a processing arrangement. The processing arrangement is configured to read one of a first plurality of portions of the data and one of a second plurality of portions of the data (corresponding to a previous video line) from a storage location of the RAM, to output the one of the first plurality of portions of the data to the receiving device, to store the one of the second plurality of portions of the data in the first storage device, to store one of a third plurality of portions of the data (corresponding to a present video line) in the second storage device, to write the one of the third plurality of portions of the data from the second storage device and one of a fourth plurality of portions of the data (also corresponding to the present video line) from the sending device into the storage location, and to output the one of the second plurality of portions of the data from the first storage device to the receiving device.

DETAILED DESCRIPTION OF THE PREFERRED EMBODIMENT

The characteristics and advantages of the present invention will become more apparent from the following description, given by way of example.

Figure 1:
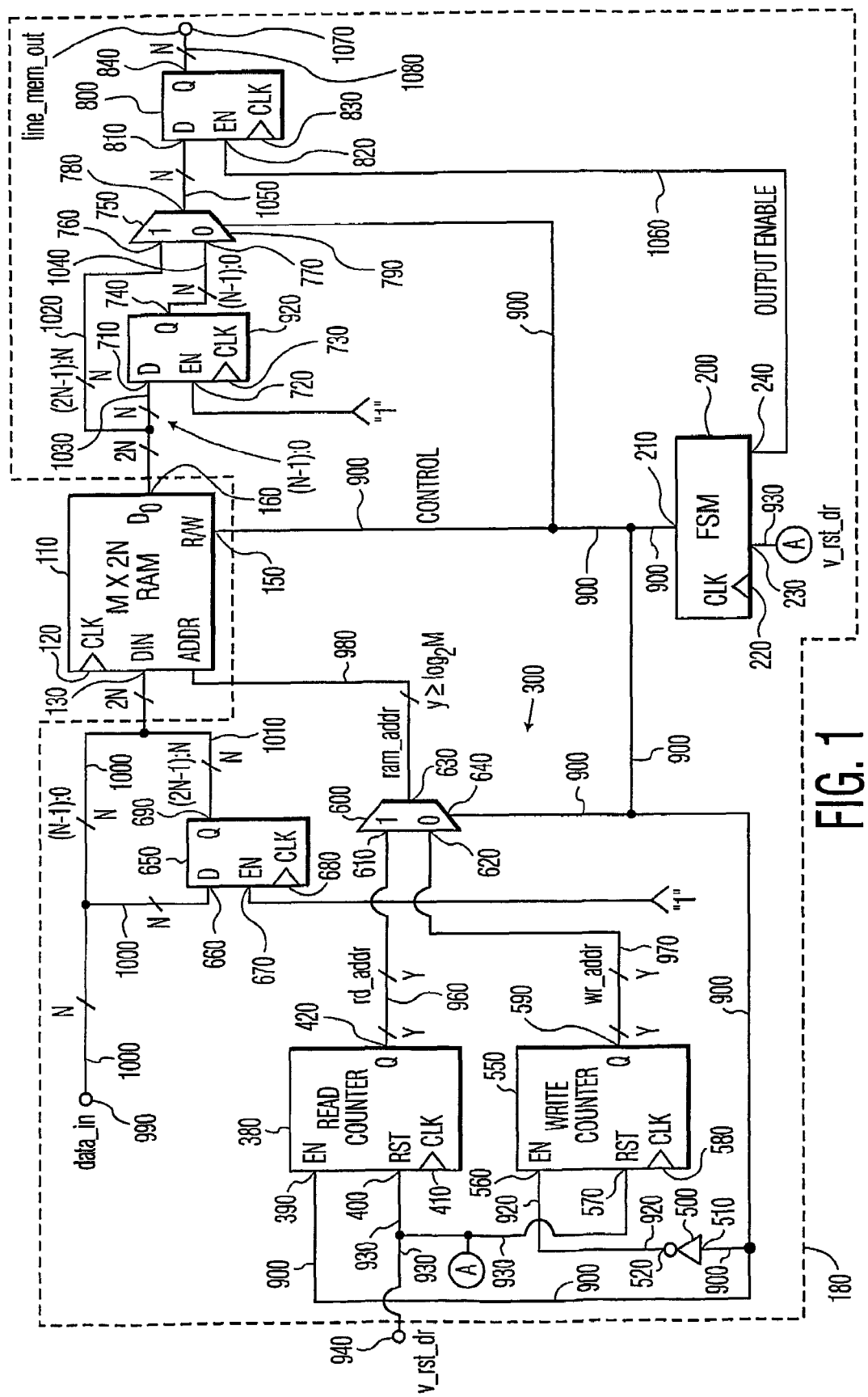
FIG. 1 is a block diagram of an exemplary digital line delay according to the present invention.

FIG. 1 is a block diagram of an exemplary digital line delay 100 according to the present invention. Line delay 100 includes an M word, 2N bit per word single port RAM 110. As used herein, the term "byte" corresponds to N bits of data and the term "word" corresponds to 2N bits of data. In conventional video applications, one line of video data is typically comprised of 1,920 pixels. Accordingly, for video applications M may be 960 and N may be 8, such that RAM 110 may be 960×16. It should be appreciated that such a configuration provides that RAM 110 may hold one line's worth of video data at 8-bits per pixel (i.e., 960 words times 2 pixels per word=1,920 pixels=1 line). However, it is noted that in alternative embodiments M and N may be any other suitable values, such that RAM 110 is configured with a storage capacity suitable for the particular application. RAM 110 includes a clock input 120, a one word or 2N-bit wide (N is discussed above) data input 130, a Y-bit wide address input 140 (where M is discussed above and $Y \geq \log_2 M$, such that the range of a received address input word may be sufficient to cover the M addresses of RAM 110), a read/write ("R/W") control input 150, and a one word or 2N-bit wide data output 160. Further, in the exemplary embodiment described herein RAM 110 is a static RAM ("SRAM"). However, it should be appreciated that in alternative embodiments, RAM 110 may be a dynamic RAM ("DRAM") or any other suitable type of single port RAM.

Line delay 100 further includes a processing arrangement 180. Processing arrangement 180 includes a finite state machine ("FSM") 200. FSM 200 is configured to regulate or control operations of line delay 100 as discussed in further detail below. FSM 200 includes a control output 210, a clock input 220, a reset input 230, and an enable output 240.

Processing arrangement 180 further includes an address counting arrangement 300. Counting arrangement 300 is configured to provide RAM address numbers designating the addresses of RAM 100 where line data is alternately read and written as discussed further below. Counting arrangement 300 includes a binary counter 380 which has an enable input 390, a reset input 400, a dock input 410, and a Y-bit wide (Y is discussed above) output 420. Counting arrangement 300 also includes an inverter 500 which has an input 510 and an output 520. Counting arrangement 300 also includes a binary counter 550 which has an enable input 560, a reset input 570, a dock input 580, and a Y-bit wide output 590. Additionally, counting arrangement 300 includes a data switch or multiplexer 600 which has a Y-bit wide data input 610, a Y-bit wide data input 620, a Y-bit wide data output 630, and a control input 640. Multiplexer 600 is configured to pass the data that it receives at its input 610 to its output 630 when it receives a logical 1 at its control input 640, and to otherwise pass the data that it receives at its input 620 to its output 630.

Processing arrangement 180 further includes a group or bank of N (N is discussed above) D Flip-Flops 650 which have a group of N respective D inputs 660, a group of N respective enable inputs 670, a group of N respective clock inputs 680, and a group of N respective Q outputs 690. Also, processing arrangement 180 includes a group or bank of N D Flip-Flops 700 which have a group of N respective D inputs 710, a group of N respective enable inputs 720, a group of N respective clock inputs 730, and a group of N respective Q outputs 740. Enable inputs 670 and enable inputs 720 are all coupled to a logical 1.

Processing arrangement 180 further includes a data switch or multiplexer 750 which has an N-bit wide data input 760, an N-bit wide data input 770, an N-bit wide data output 780, and a control input 790. Multiplexer 750 is configured to pass the data that it receives at its input 760 to its output 780 when it receives a logical 1 at its control input 790, and to otherwise pass the data that it receives at its input 770 to its output 780. Additionally, processing arrangement 180 includes a group or bank of N D Flip-Flops 800 which have a group of N respective D inputs 810, a group of N respective enable inputs 820, a group of N respective dock inputs 830, and a group of N respective Q outputs 840.

Processing arrangement 180 further includes a conductor 900 that couples control output 210 to R/W control input 150 of RAM 110, to enable input 390 of counter 380, to input 510 of inverter 500, to control input 640 of multiplexer 600, and to control input 790 of multiplexer 750. Processing arrangement 180 further includes a conductor 920 that couples output 520 of inverter 500 to enable input 560 of counter 550. Processing arrangement 180 further includes a conductor 930 that couples reset input 400 of counter 380 to reset input 570 of counter 550 and to reset input 230 of FSM 200. Processing arrangement 180 also includes a vertical reset input 940. Conductor 930 also couples reset input 400, reset input 570, and reset input 230 to vertical reset input 940.

Processing arrangement 180 also includes a group or bank of Y conductors 960 (Y is discussed above) that couple each respective one of Q outputs 420 of counter 380 to the respective bit of input 610 of multiplexer 600. Processing arrangement 180 also includes a group or bank of Y conductors 970 that couple each respective one of Q outputs 590 of counter 550 to the respective bit of input 620 of multiplexer 600. Processing arrangement 180 also includes a group or bank of conductors 980 that couple each respective one of outputs 630 of multiplexer 600 to the respective bit of address input 140 of RAM 110.

Processing arrangement 180 further includes an N-bit wide (N is discussed above) data-in port 990 and a group or bank of N conductors 1000 that couple the bits of data-in port 990 to respective (N−1):0 bits of data input 130 of RAM 110. Conductors 1000 also couple the bits of data-in port 990 to respective D inputs 660 of D Flip-Flops 650. Processing arrangement 180 also includes a group or bank of N conductors 1010 that couple Q outputs 690 of D Flip-Flops 650 to respective (2N−1):N bits of data input 130 of RAM 110.

Processing arrangement 180 further includes a group or bank of N conductors 1020 (N is discussed above) that couple respective outputs (2N−1):N from data output 160 of RAM 110 to inputs 760 of multiplexer 750. Processing arrangement 180 also includes a group or bank of N conductors 1030 that couple respective outputs (N−1):0 from data output 160 of RAM 110 to D inputs 710 of D Flip-Flops 700. Processing arrangement 180 also includes a group or bank of N conductors 1040 that couple Q outputs 740 of D Flip-Flops 700 to respective inputs 770 of multiplexer 750. Further, processing arrangement 180 includes a group or bank of N conductors 1050 that couple N-bit wide output 780 of multiplexer 750 to respective D inputs 810 of D Flip-Flops 800. Processing arrangement 180 also includes a conductor 1060 that couples enable output 240 of FSM 200 to all enable inputs 820 of D Flip-Flops 800. Additionally, processing arrangement 180 includes an N-bit wide line memory output 1070 and a group or bank of N conductors 1080 that couple Q outputs 840 of D Flip-Flops 800 to line memory output 1070.

Figure 2:
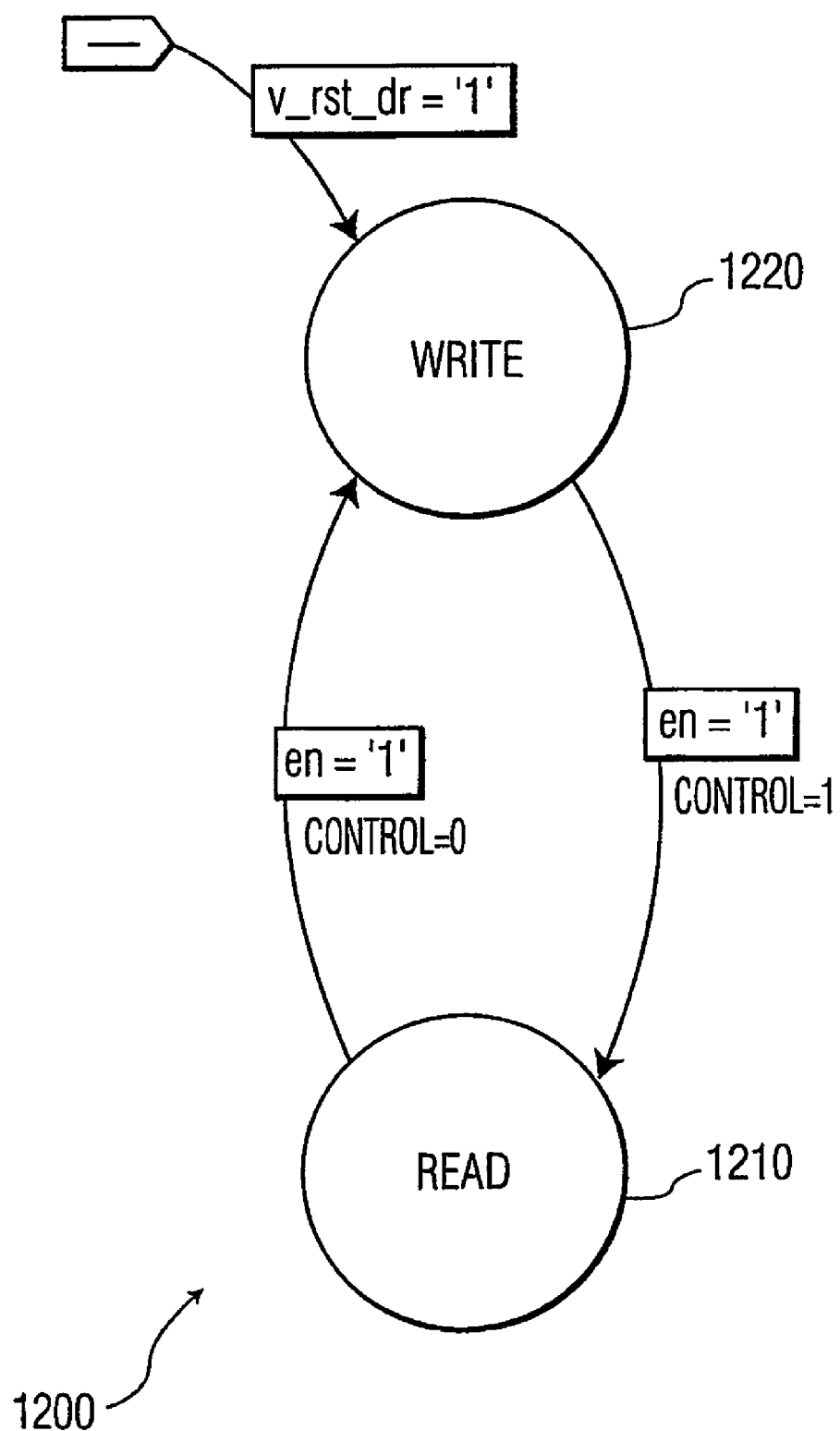
FIG. 2 is a state diagram of exemplary operations of the finite state machine ("FSM") of the exemplary digital line delay of FIG. 1.

FIG. 2 is a state diagram of exemplary operations 1200 of FSM 200 of exemplary digital line delay 100 of FIG. 1. In the exemplary embodiment, FSM 200 has only two states: a read state 1210, and a write state 1220. In operation, exemplary FSM 200 provides a CONTROL signal at its control output 210 and provides an ENABLE signal at its enable output 240. In read state 1210, FSM causes the CONTROL signal to become a logical 1 and causes the ENABLE signal to become or remain a logical 1. In write state 1220, FSM causes the CONTROL signal to become a logical 0 and causes the ENABLE signal to become or remain a logical 1. Further, FSM 200 restarts or resets from write state 1220 upon detection of a logical 1 state or pulse of a conventional video vertical reset signal ("V_RST_DR") from an external device (not shown) received via vertical reset input 940 and conductor 930. Although one of the benefits of the exemplary embodiment is that FSM 200 has only two states, it should be appreciated that in alternative embodiments FSM 200 may perform additional operations, and thus, may have more states than shown in FIG. 2 and/or more inputs or outputs than shown in FIG. 1.

Figure 3:
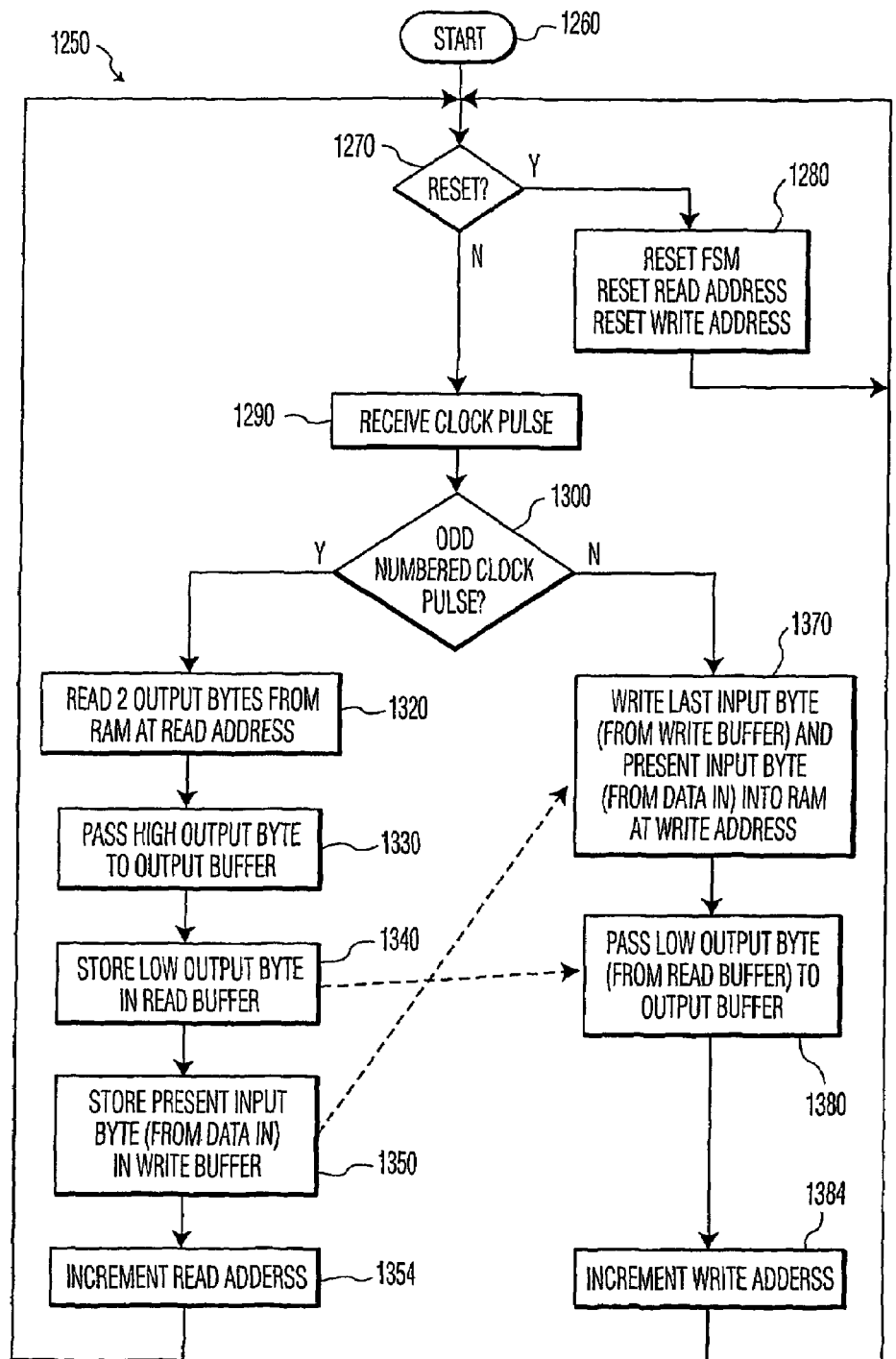
FIG. 3 is a flow diagram of exemplary operations of the digital line delay of FIG. 1.

FIG. 3 is a flow diagram of exemplary operations 1250 of the digital line delay 100 of FIG. 1. In operation, an external system clock (not shown) provides a conventional synchronous clock signal. ("CLOCK") to the various components of line delay 100 (via clock input 120, clock input 220, clock input 410, clock input 580, clock input 680, clock input 730, clock input 830, etc.—see FIG. 1) in a manner which is well known. It should be appreciated that as the CLOCK signal drives the various components of line delay 100 in synchronism, line delay 100 executes one iteration of operations for each cycle or pulse of the CLOCK signal more or less concurrently, and thus, flow diagram 1250 is merely exemplary of the conceptual nature of operations from CLOCK cycle to CLOCK cycle and is not meant to limit the invention to a particular sequence or order of operations during the course or span of a CLOCK cycle.

At step 1260, line delay 100 executes appropriate power-up initialization operations in a manner which is well known. After step 1260 operations, line delay 100 proceeds to step 1270. At step 1270, line delay 100 determines whether a processing reset is called for by an external device (not shown). In the exemplary embodiment, line delay 100 makes this determination based on V_RST_DR, the conventional video vertical reset signal, which it receives from the external device (not shown) via vertical reset input 940. If a reset is called for, then line delay 100 proceeds to step 1280; otherwise, line delay 100 proceeds to step 1290.

At step 1280, line delay 100 executes appropriate processing reset operations. Step 1280 operations include FSM 200 resetting to its write state 1220 (see FIG. 2, discussed above). Step 1280 operations also include line delay 100 causing counter 380 to reset (i.e., all Q outputs 420 to become 0) and counter 550 to reset (i.e., all Q outputs 590 to become 0) in manners which are well known. After step 1280 operations, line delay 100 loops back to step 1270.

At step 1290, line delay 100 receives a pulse or transition of the CLOCK signal from the external system clock (not shown). After step 1290 operations, line delay 100 proceeds to step 1300. At step 1300, line delay 100 determines whether the present pulse of the CLOCK signal is an odd numbered pulse (i.e., the first, third, or fifth . . . etc. pulse received since the last processing reset) or an even numbered pulse (i.e., the second, fourth, or sixth, . . . etc. pulse received since the last processing reset). In the exemplary embodiment, this determination is facilitated by FSM 200 having only two states (see FIG. 2). FSM 200 assumes read state 1210 upon its reception of the first clock pulse after a reset, assumes write state 1220 upon its reception of the second clock pulse, and so on, as it alternates between read state 1210 and write state 1220 for odd clock pulses and even clock pulses, respectively. When line delay 100 determines that the CLOCK signal has provided an odd numbered pulse, line delay 100 proceeds to steps 1320–1354; otherwise, line delay 100 proceeds to steps 1370–1384.

At step 1320, line delay 100 reads a word (i.e., two byes) of data from address number RD_ADDR of RAM 110. In the exemplary embodiment, this is facilitated by RAM 110 receiving the RD_ADDR number at its address input 140, by RAM 110 receiving the CONTROL signal at its R/W control input 150, by multiplexer 750 receiving bits (2N−1):N of the word at input 760, and by D Flip-Flops 700 receiving bits (N−1):0 of the word at D inputs 710. After step 1320 operations, line delay 100 proceeds to step 1330.

At step 1330, line delay 100 passes bits (2N−1):N (i.e., the "high" byte) of the word read in step 1320 through multiplexer 750 to D Flip-Flops 800. It should be appreciated that multiplexer 750 passes the high byte because FSM 200 is in its read state 1210 (see step 1300, discussed above), and thus, the CONTROL signal at control input 790 is a logical 1 for these operations. D Flip-Flops 800 buffer the high byte before passing it to line memory output 1070 via Q outputs 840. It is noted, however, that this buffering by D Flip-Flops 800 is merely exemplary and not critical to the invention. In alternative embodiments in which D Flip-Flops 800 are omitted, line delay 100 passes the high byte directly to line memory output 1070. After step 1330 operations, line delay 100 proceeds to step 1340.

At step 1340, line delay 100 stores bits (N−1):0 (i.e., the "low" byte) of the word read in step 1320 in D Flip-Flops 700. It should be appreciated, then, that D Flip-Flops 700 provide a "read buffer" which stores or retains the low byte while the high byte is advanced through multiplexer 750. After step 1340 operations, line delay 100 proceeds to step 1350.

At step 1350, line delay 100 also stores the present byte of the incoming line data provided by an external device (not shown). Line delay 100 receives this byte of data at data-in port 990 and stores it in D Flip-Flops 650. It should be appreciated that although this byte is included in a word that appears at data input 130 of RAM 110, RAM 110 disregards the word at data input 130 during step 1350 operations because the CONTROL signal that it receives at its R/W control input is a logical 1 (FSM 200 is in its read state 1210) which commands a read operation. After step 1350 operations, line delay 100 proceeds to step 1354.

At step 1354, line delay 100 increments a read address ("RD_ADDR"). RD_ADDR is the binary number represented by Q outputs 420 of counter 380. In the exemplary embodiment, this is facilitated by the state of the CONTROL signal provided by FSM 200 at its control output 210. When FSM 200 is in its read state 1210, the CONTROL signal is a logical 1. Counter 380 is enabled when the logical 1 CONTROL signal is received at enable input 390. Counter 380 also receives the present CLOCK pulse and increments Q outputs 420 accordingly. Additionally, in response to the logical 1 state of the CONTROL signal, multiplexer 600 passes the RD_ADDR number to its output 630. After step 1354 operations, line delay 100 loops back to step 1270.

At step 1370, line delay 100 writes a word comprised of the previously stored byte of data (see step 1350, discussed above) and the new present byte of the incoming line data from the external device as bits (2N−1):N and (N−1):0, respectively, into address number WR_ADDR of RAM 110. Line delay 100 retrieves the previously stored byte of data from Q outputs 690 of D Flip-Flops 650. RAM 110 writes the word into address number WR_ADDR because FSM 200 is in its write state 1220 during these operations (see step 1300, discussed above), which makes the CONTROL signal that RAM 110 receives at its R/W control input 150 a logical 0, which commands a write operation, and because multiplexer 600 provides the WR_ADDR number to address input 140. After step 1370 operations, line delay 100 proceeds to step 1380.

At step 1380, line delay 100 passes bits (N−1):0 (i.e., the "low" byte) of the word read in step 1320 from Q outputs 740 of D Flip-Flops 700 through multiplexer 750 to D Flip-Flops 800. It should be appreciated that multiplexer 750 passes the low byte from Q outputs 740 because FSM 200 is in its write state 1210 (see step 1300, discussed above), and thus, the CONTROL signal at control input 790 is a logical 0 for these operations. Like in step 1330, D Flip-Flops 800 buffer the low byte before passing it to line memory output 1070 via Q outputs 840. Again, this buffering by D Flip-Flops 800 is merely exemplary and not critical to the invention. In alternative embodiments in which D Flip-Flops 800 are omitted, line delay 100 passes the low byte directly to line memory output 1070. After step 1380 operations, line delay 100 proceeds to step 1384.

At step 1384, line delay 100 increments a write address ("WR_ADDR"). WR_ADDR is the binary number represented by Q outputs 590 of counter 550. In the exemplary embodiment, this is facilitated by the state of the CONTROL signal provided by FSM 200 at its control output 210. When FSM 200 is in its write state 1220, the CONTROL signal is a logical 0. Counter 550 is enabled when the logical 0 CONTROL signal is inverted by inverter 500 and the resulting logical 1 is received at enable input 560. Counter 550 also receives the present CLOCK pulse and increments Q outputs 590 accordingly. Additionally, in response to the logical 0 state of the CONTROL signal, multiplexer 600 passes the WR_ADDR number to its output 630. After step 1384 operations, line delay 100 loops back to step 1270.

Figure 4:
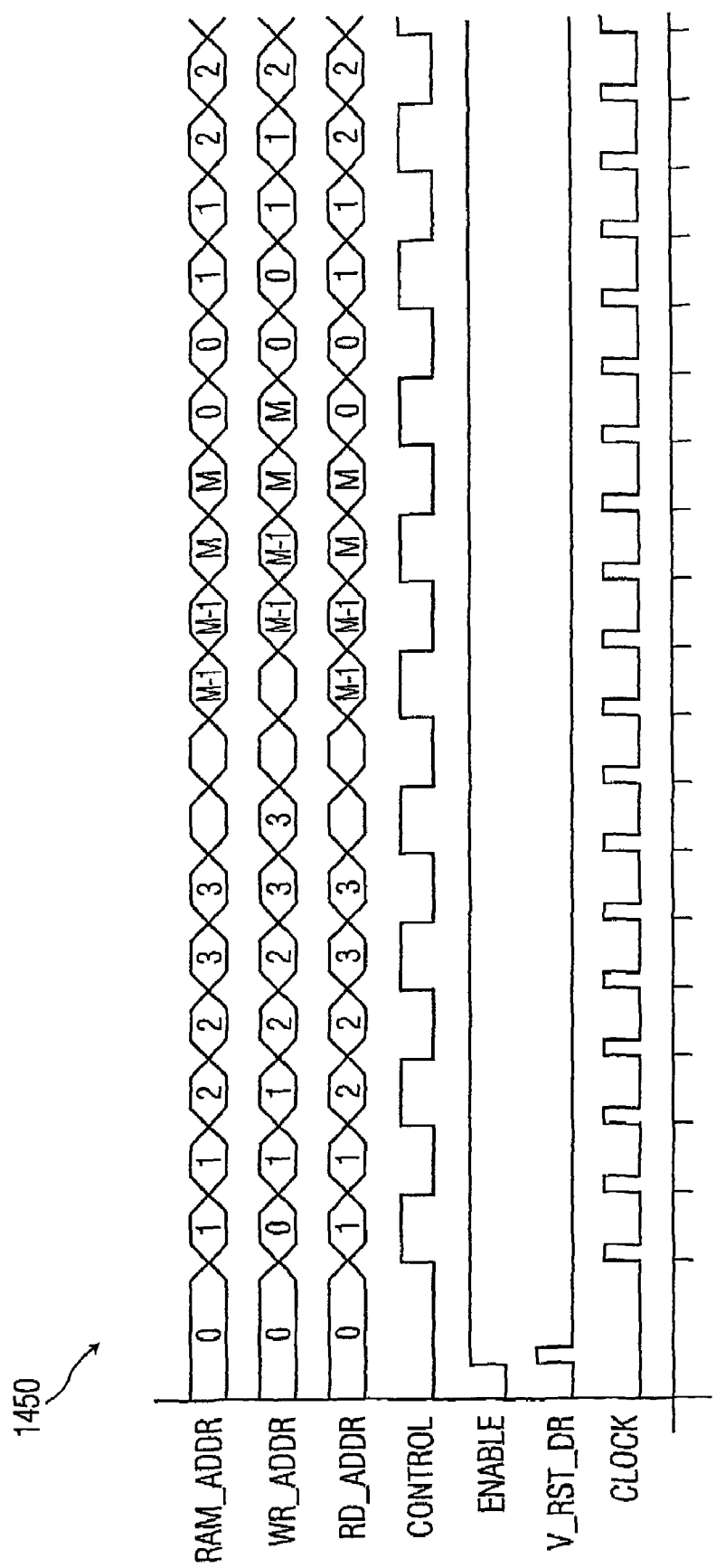
FIG. 4 is a timing diagram of exemplary operations of the digital line delay of FIG. 1.

FIG. 4 is a timing diagram of exemplary operations 1450 of the digital line delay 100 of FIG. 1. The RD_ADDR begins at 0, increments on odd numbered CLOCK cycles, ranges from 0 to M (M is discussed above), resets to 0, and continually repeats the sequence. The WR_ADDR begins at 0, increments on even numbered CLOCK cycles, ranges from 0 to M, resets to 0, and continually repeats the sequence. The RAM_ADDR begins at 0, increments on odd numbered CLOCK cycles, ranges from 0 to M, resets to 0, and continually repeats the sequence. It should be appreciated that line delay 100 performs a "read cycle" (steps 1320–1354, discussed above) each CLOCK cycle that the CONTROL signal is a logical 1 (FSM 200 is in its read state 1210) and line delay 100 performs a "write cycle" (steps 1370–1384, discussed above) each CLOCK cycle that the CONTROL signal is a logical 0 (FSM 200 is in its write state 1220). Thus, exemplary line delay 100 time-multiplexes single port RAM 110 between read and write operations. Additionally, exemplary FSM 200 regulates operations of line delay 100 with only two states. It should be appreciated that the first full reading or outputting of data from RAM 110 by line delay 100 after power up (i.e., the first set of CLOCK cycles after power up for which either RD_ADDR or WR_ADDR is not 0) provides whatever data arbitrarily happens to be in RAM 110 at power up. Thereafter, because exemplary line delay 100 reads data stored from the last or previous line from each of the M addresses of RAM 110 before writing data from the new or present line to that address, exemplary line delay 100 provides a one line delay.

What is claimed is:

1. An apparatus for delaying video line data between a sending device and a receiving device, the video line data including data corresponding to a previous video line and data corresponding to a present video line, the data corresponding to the previous video line including a first data portion and a second data portion, and the data corresponding to the present video line including a third data portion and a fourth data portion, the apparatus comprising:

a single port random access memory ("RAM") including a plurality of storage locations; and a processing arrangement including a first storage device coupled to the RAM and a second storage device coupled to the RAM, the processing arrangement configured to read the first data portion and the second data portion from one of the storage locations of the RAM, output the first data portion from the RAM to the receiving device, store the second data portion in the first storage device, store the third data portion from the sending device to the second storage device, write the third data portion from the second storage device and the fourth data portion from the sending device into the one of the storage locations of the RAM, and output the second data portion from the first storage device to the receiving device.

2. The apparatus of claim 1, wherein:

the processing arrangement is further configured to concurrently read the first data portion and the second data portion from the one of the storage locations of the RAM, output the first data portion to the receiving device, store the second data portion in the first storage device, and store the third data portion in the second storage device, and the processing arrangement is further configured to concurrently write the third data portion from the second storage device and the fourth data portion from the sending device into the one of the storage locations of the RAM, and output the second data portion from the first storage device to the receiving device.

3. The apparatus of claim 2, wherein:

the processing arrangement is further configured to read the first data portion and the second data portion from the one of the storage locations of the RAM, output the first data portion to the receiving device, store the second data portion in the first storage device, and store the third data portion in the second storage device, and the processing arrangement is further configured to alternately write the third data portion from the second storage device and the fourth data portion from the sending device into the one of the storage locations of the RAM, and output the second data portion from the first storage device to the receiving device.

4. The apparatus of claim 3, wherein:

the processing arrangement is further configured to, at a rate corresponding to a clock signal, read the first data portion and the second data portion from the one of the storage locations of the RAM, output the first data portion to the receiving device, store the second data portion in the first storage device, and store the third data portion in the second storage device, and the processing arrangement is further configured to, at about the same rate, write the third data portion from the second storage device and the fourth data portion from the sending device into the one of the storage locations of the RAM, and output the second data portion from the first storage device to the receiving device.

5. The apparatus of claim 4, wherein the processing arrangement further includes a means for sequentially incrementing a first address, a means for sequentially incrementing a second address, and a means for alternately providing the first address and the second address to the RAM.

6. The apparatus of claim 5, wherein the processing arrangement further includes a finite state machine configured to control the address providing means.

7. The apparatus of claim 1, wherein:

the first storage device includes a first number of D Flip-Flops, the second storage device includes a second number of D Flip-Flops, and the first number of D Flip-Flops is equal to the second number of D Flip-Flops.

8. The apparatus of claim 1, wherein the RAM includes a dynamic RAM.

9. A method for delaying video line data between a sending device and a receiving device, the video line data including data corresponding to a previous video line and data corresponding to a present video line, the data corresponding to the previous video line including a first data portion and a second data portion, and the data corresponding to the present video line including a third data portion and a fourth data portion, the method comprising the steps of:

reading the first data portion and the second data portion from a storage location of a single port random access memory ("RAM");

outputting the first data portion to the receiving device;

storing the second data portion in a first storage device;

storing the third data portion in a second storage device;

writing the third data portion from the second storage device and the fourth data portion from the sending device into the storage location of the RAM; and outputting the second data portion from the first storage device to the receiving device.

10. The method of claim 9, wherein:

the steps of reading the first data portion and the second data portion, outputting the first data portion, storing the second data portion, and storing the third data portion are performed concurrently, and the steps of writing the third data portion and the fourth data portion and outputting the second data portion are performed concurrently.

11. The method of claim 10, wherein:

the steps of (a) reading the first data portion and the second data portion, outputting the first data portion, storing the second data portion, and storing the third data portion are performed alternately with the steps of (b) writing the third data portion and the fourth data portion and outputting the second data portion.

12. The method of claim 11, wherein:

the steps of (a) reading the first data portion and the second data portion, outputting the first data portion, storing the second data portion, and storing the third data portion are performed at a rate corresponding to a clock signal, and the steps of (b) writing the third data portion and the fourth data portion and outputting the second data portion are performed at about the same rate.

13. The method of claim 12, further comprising the steps of:

sequentially incrementing a first address;

sequentially incrementing a second address; and alternately providing the first address and the second address to the RAM.

14. The method of claim 9, wherein:

the step of storing the third data portion includes storing the third data portion in a number of D Flip-Flops, and the step of storing the second data portion includes storing the second data portion in an equal number of D Flip-Flops.

15. The method of claim 9, wherein the step of reading the first data portion and the second data portion includes reading the first data portion and the second data portion from a dynamic RAM.

* * * * *